(12) United States Patent
Zevenbergen

(10) Patent No.: US 11,518,551 B1
(45) Date of Patent: Dec. 6, 2022

(54) SECUREMENT AND RELEASE MECHANISMS FOR SPACECRAFT

(71) Applicant: Lockheed Martin Corporation, Bethesda, MD (US)

(72) Inventor: Matthew Owen Zevenbergen, Littleton, CO (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 842 days.

(21) Appl. No.: 16/424,204

(22) Filed: May 28, 2019

(51) Int. Cl.
*B64G 1/64* (2006.01)

(52) U.S. Cl.
CPC ............... *B64G 1/641* (2013.01); *B64G 1/64* (2013.01)

(58) Field of Classification Search
CPC .................................. B64G 1/641; B64G 1/64
See application file for complete search history.

(56) References Cited

U.S. PATENT DOCUMENTS

| | | | | |
|---|---|---|---|---|
| 6,126,115 A * | 10/2000 | Carrier | ................... | B64G 1/641 294/82.26 |
| 7,464,634 B1 * | 12/2008 | Shah | ........................ | F41F 1/00 89/1.8 |
| 7,644,891 B2 * | 1/2010 | Aston | .................... | B64G 1/641 244/172.4 |
| 8,708,322 B2 * | 4/2014 | Young | .................... | B64G 1/641 269/160 |

* cited by examiner

*Primary Examiner* — Richard Green
*Assistant Examiner* — Steven J Shur
(74) *Attorney, Agent, or Firm* — BakerHostetler

(57) ABSTRACT

A carrier of a spacecraft can include multiple latch assemblies that are linked together and held in place by one notched bolt or main shaft, which is out of the main load path. The latch assemblies secure the payload (e.g., CubeSat device) within a carrier by interfacing with pin assemblies on the payload. To deploy the payload, the shape memory alloy actuator is fired which causes a series of springs and preload forces to rotate latches of the latch assemblies out of the path of the pin assemblies. Once the latches are out of the way, the payload is deployed by a spring-loaded pusher assembly and guided through deployment using rollers. Each latch assembly is preloaded in tension using a corresponding preload lug of a receiver assembly.

19 Claims, 19 Drawing Sheets

SECUREMENT AND RELEASE MECHANISMS FOR SPACECRAFT

STATEMENT REGARDING FEDERALLY SPONSORED RESEARCH OR DEVELOPMENT

The invention was made with Government support. The Government has certain rights in this invention.

TECHNICAL FIELD

The present description relates in general to securement and release mechanisms for spacecraft, and more particularly to, for example, without limitation, transport and release of cargo in a low gravity or zero gravity environment.

BACKGROUND OF THE DISCLOSURE

Space flight can be used to transport payloads. Such a payload can include satellites or other instruments for deployment in orbit. For example, a vehicle can be launched with a satellite as a payload. Upon achievement of a particular trajectory (e.g., orbit), the vehicle can deploy the satellite so that it can continue independently of the vehicle.

The description provided in the background section should not be assumed to be prior art merely because it is mentioned in or associated with the background section. The background section may include information that describes one or more aspects of the subject technology.

Figure 1:
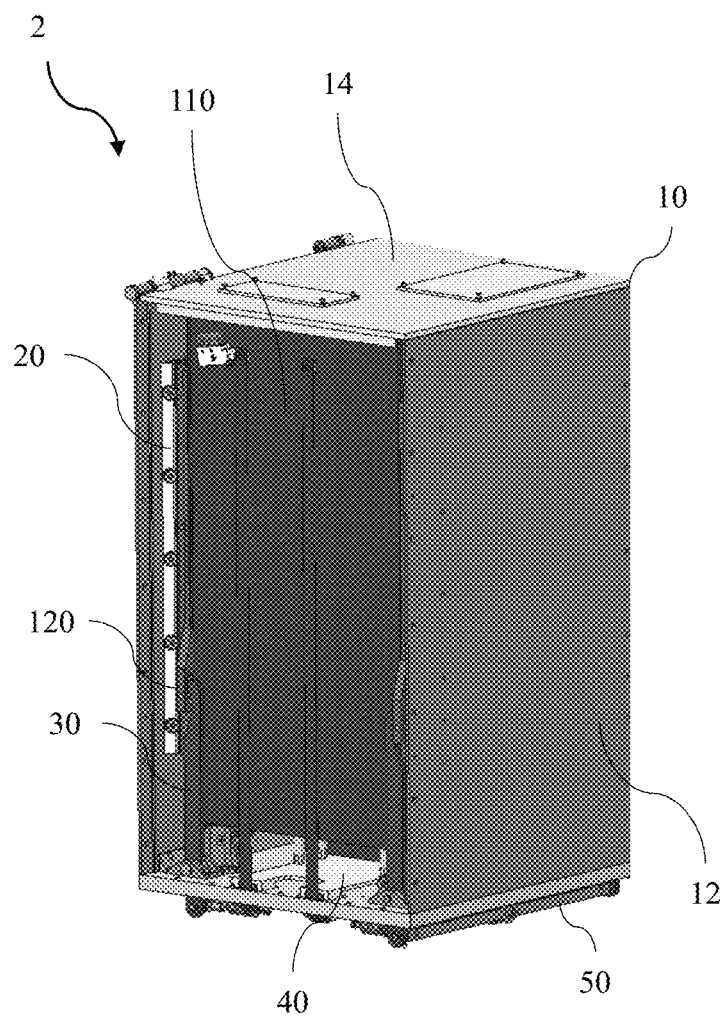
FIG. 1 illustrates a perspective view of an example of a spacecraft, including a carrier and a payload.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

A spacecraft can be provided to deliver and deploy a payload in space. Such payloads can include satellites, such as CubeSat devices. A payload must be secured during transit and controllably deployed at a desired time and location. It can be desirable to provide a reliable mechanism for restraining and deploying payloads in excess of 36 kg for long-life missions (e.g., 8 years or more). Current commercially available designs are not designed to reliably accommodate CubeSat devices of such size for such long missions, and are instead focused on ease of integration for short missions.

In some designs, a payload is directly secured to a dispenser baseplate with a bolt that can be severed. However, such designs have limited retention capabilities while maintaining reliable release. The shock created by such direct retention mechanisms can go directly into the payload, causing potential damage. Where multiple mechanisms are provided to increase retention strength, the mechanisms may not have accurate and well-coordinated actuation times, thereby causing unbalanced forced to be applied at different times.

According to embodiments of the present disclosure, a carrier of a spacecraft can include multiple latch assemblies that are linked together and held in place by a main shaft (e.g., notched bolt), which is out of the main load path. The latch assemblies secure the payload (e.g., CubeSat device) within a carrier by interfacing with pin assemblies on the payload. To deploy the payload, an actuator is fired which severs the main shaft and causes a series of springs and preload forces to rotate latches of the latch assemblies out of the path of the pin assemblies. Once the latches are out of the way, the payload is deployed by a spring-loaded pusher assembly and guided through deployment using rollers. The dimensions of the latch assemblies can be easily modified to accommodate the payload design and testing requirements.

After the latch assemblies are engaged and secured with the main shaft, each latch assembly is preloaded in tension using a corresponding preload lug of a receiver assembly. The receiver assemblies can include a threaded preload lug to push a cup element toward the payload. These two parts are captured in a receiver housing that is attached to the carrier and reacts the preload from the payload. A set of cone or ball interfaces can be used to preload against with the cup element. The amount of preload being put into the interface can be monitored by instrumenting the four latch assemblies with strain gages. This allows the preload value to be catered to the specific payload's design requirements to ensure that the interfaces do not gap under launch conditions.

Referring to FIG. 1, a spacecraft can be provided with a system for transporting and deploying a payload from a carrier of the spacecraft. For example, as shown in FIG. 1, a spacecraft 2 can include a carrier 10 for receiving, transporting, and deploying a payload 110. The carrier 10 can be provided with mechanisms to controllably retain and release the payload 110. It will be understood that the carrier 10 can be a part of a spacecraft that includes a variety of other components. For example, the carrier 10 can be a subsystem or module of a spacecraft. By further example, multiples carriers can be incorporated into a spacecraft. Additionally or alternatively, a carrier can be provided with multiple bays each for receiving a corresponding payload.

The carrier can accommodate a payload of a variety of shapes, sizes, and weights. Such payloads can have a variety of functions and capabilities, particularly upon deployment. In one example, the payload can include a satellite system, such as a CubeSat device. The satellite system can include a chassis supporting other components. The satellite system can be provided with a control board, an interface board, a battery, a solar cell (e.g., extendable from the chassis), an antenna, sensors, thrusters. At least some of the components of the payload can be reside in substantially parallel planes. One or more of the components can be extendable from the chassis.

As shown in FIG. 1, the carrier 10 can include a frame 12 that at least partially encloses the payload 110. While the frame 12 is shown with at least one open side in FIG. 1, it will be understood that the frame 12, along with the door 14, can either partially or entirely enclose the payload 110. The door 14 can be provided at a side of the frame 12 with a capability to controllably open to receive and/or deploy the payload 110 and close to contain the payload 110 at least partially within the frame 12. The door 14 can be provided with hinges, latches, locks, actuators, motors, and/or other mechanisms to controllably operate the door 14.

The carrier 10 can be provided with a roller assembly 20 for guiding the payload 110 into and/or out of the frame 12 of the carrier 10, as discussed further herein. The carrier 10 can be further provided with a latch assembly 30 for engaging the payload 110, for example at a pin assembly 120 thereof, as discussed further herein. The carrier 10 can be further provided with a release assembly 50 for releasing the latch assembly 30 of the carrier 10 from the pin assembly 120 of the payload 110, as discussed further herein. The carrier 10 can be further provided with a pusher assembly 40 for moving the payload 110 out of the carrier 10 after release, as discussed further herein.

Figure 2:
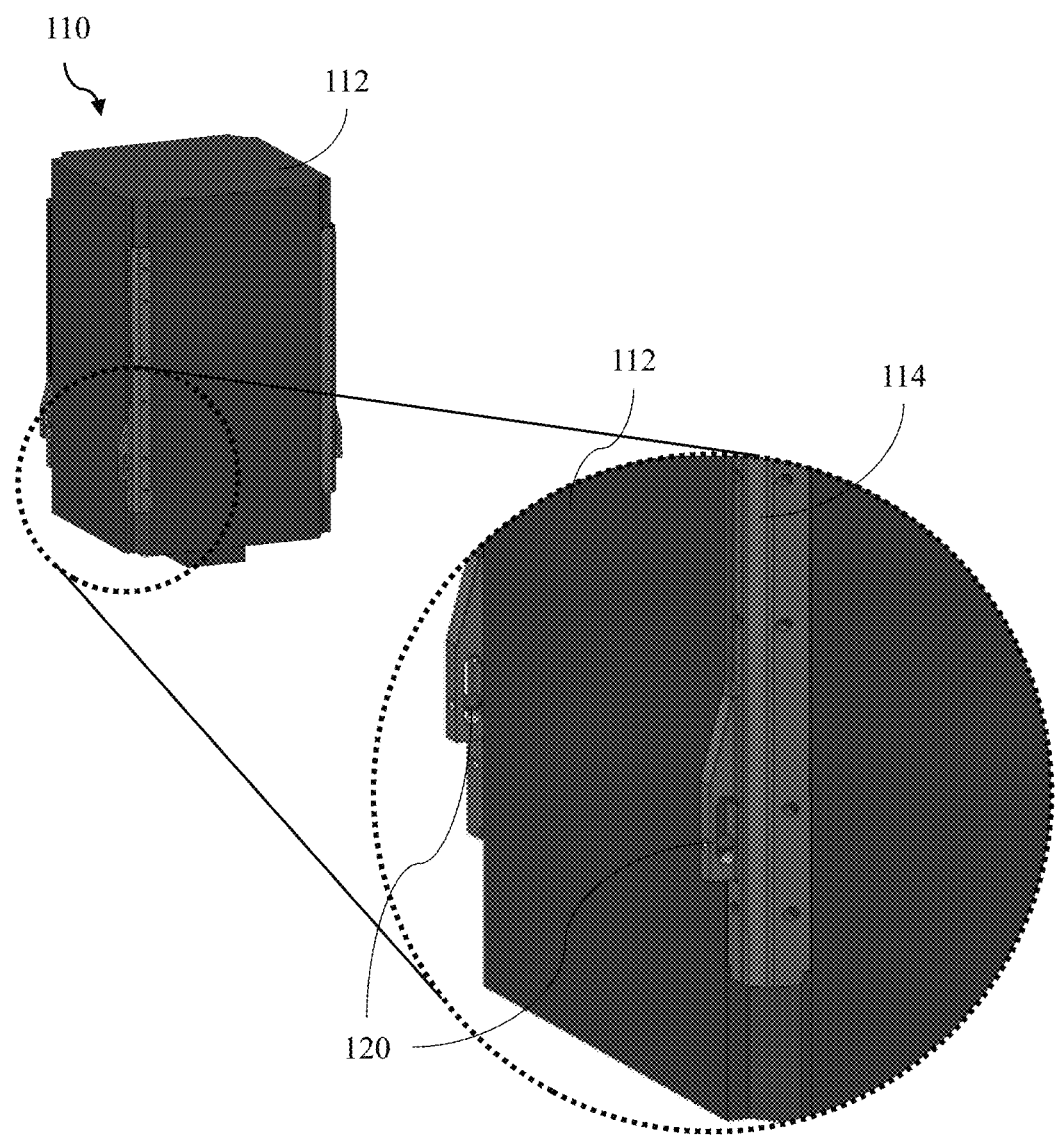
FIG. 2 illustrates a perspective view of an example of a payload, including an enlarged view.

Referring now to FIG. 2, the payload can be provided with mechanisms for engaging and/or interfacing with the carrier. For example, as shown in FIG. 2, the payload 110 can include a body 112 that includes, supports, and or houses one or more other components of the payload 110. At an exterior portion of the payload 110, one or more rails 114 can be provided. The rails 114 can provide surfaces for interacting with portions of the roller guides of the carrier. The rails 114 can be positioned at one or more edges of the payload 110. At another exterior portion of the payload 110, one or more pin assemblies 120 can be provided. The pin assemblies 120 can provide components for engagement by the latch assemblies of the carrier. Multiple (e.g., pairs of) the pin assemblies 120 can be provided at or near edges of the payload 110 and/or on opposing sides thereof.

Figure 3:
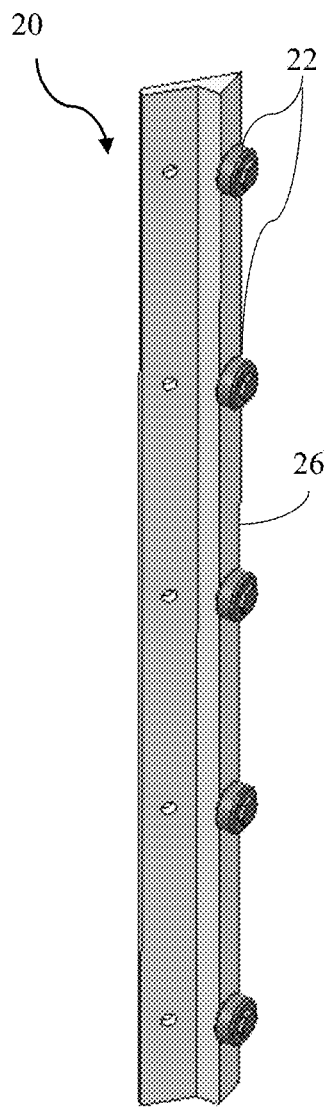
FIG. 3 illustrates a perspective view of an example of a roller assembly for a carrier.
Figure 4:
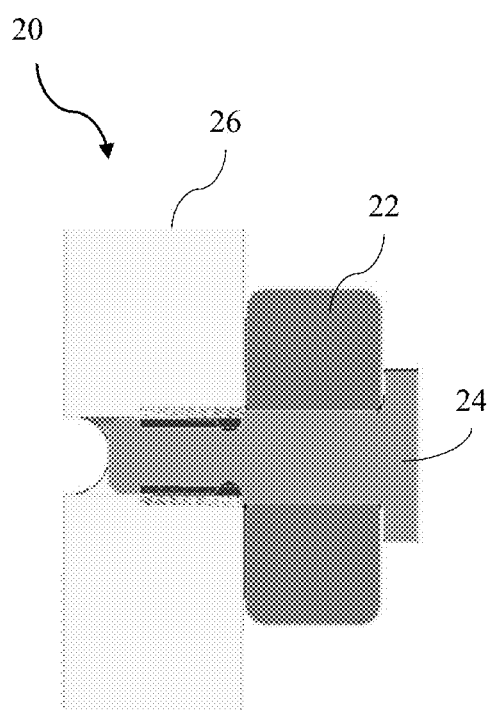
FIG. 4 illustrates a sectional view of a portion of the roller assembly of FIG. 3.
Figure 5:
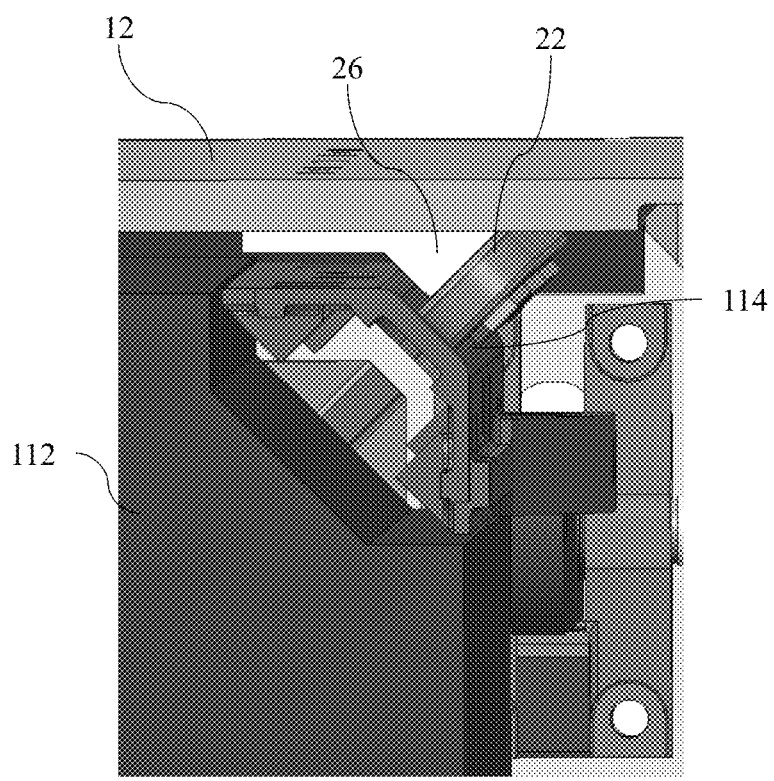
FIG. 5 illustrates a perspective and sectional view of a portion of a spacecraft, including a roller assembly of a carrier and a rail of a payload.

Referring now to FIGS. 3-5, the carrier can be provided with one or more roller assemblies for guiding the payload into and/or out of the frame of the carrier. For example, as shown in FIG. 3, a roller assembly 20 can include a roller support 26 and multiple rollers 22. The rollers can be aligned along an axis that defines directions of travel for the payload. Each roller 22 can rotate about its own axis, wherein the axis of rotation of every roller 22 of a given roller assembly 20 can be parallel to each other. As shown in FIG. 4, each roller 22 can be coupled to the roller support 26 by a corresponding roller bolt 24. The roller 22 can rotate about the roller bolt 24, which can be attached to the roller support 26.

As shown in FIG. 5, as the payload 110 is inserted into the frame 12 of the carrier, the rails 114 of the payload 110 can move along the rollers 22. Where the rails 114 and the rollers 22 come into contact, the rollers 22 can rotate to allow movement of the payload 110 past the rollers 22. The rollers 22 can optionally bear at least a portion of the weight of the payload 110 as it moves into or out of the frame 12. As further shown in FIG. 5, the rails 114 can face radially outwardly from an axis of travel for the payload 110. Additionally, the rollers 22 can face radially inwardly from the axis of travel for the payload 110.

The rails 114 and the rollers 22 can be sized and positioned so that an opposing pair of rails 114 are separated by a distance smaller than an opposing pair of rollers 22. Accordingly, a gap can be formed at one or both of the interfaces, so that the payload is not tightly fit into the carrier. Such a gap also provides a degree of freedom of movement of the payload as it travels within the carrier.

While the examples illustrated in the figures show the rails 114 on the payload 110 and the roller assemblies 20 on the carrier 10, it will be understood that the arrangement can be altered. For example, roller assemblies 20 can be provided on the payload 110 and rails 114 can be provided on the carrier 10. Alternatively, both the carrier 10 and the payload 110 can include one or more roller assemblies 20 and/or rails 114.

Figure 6:
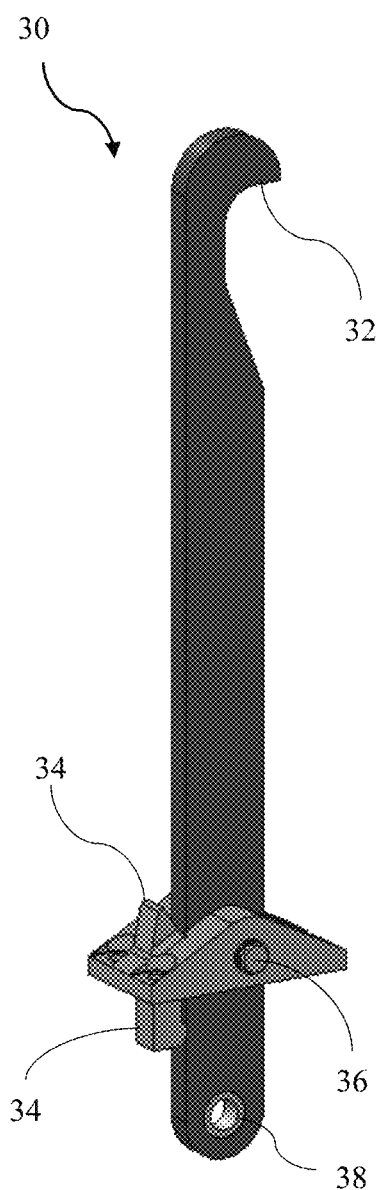
FIG. 6 illustrates a perspective view of an example of a latch assembly for a carrier.
Figure 7:
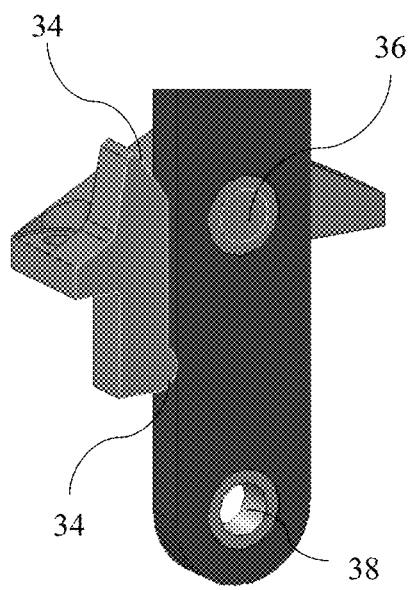
FIG. 7 illustrates a perspective and sectional view of the latch assembly of FIG. 6.

Referring now to FIGS. 6 and 7, a latch assembly can facilitate movement and locking actions for engaging a payload with a latch. As shown in FIG. 6, the latch assembly 30 can include a latch 32 that can act as a lever arm for engaging a payload. The latch 32 can extend from a pivot 36. At an end region of the latch 32, a portion of the latch 32 can have a size and/or shape that is configured to engage a portion of the payload. For example, the latch 32 can form an arm, hook, and/or other feature for engaging the payload.

As shown in FIG. 7, the latch 32 can be configured to rotate about the pivot 36. One or more stoppers 34 can be provided to limit rotational movement of the latch 32 in one or more directions (e.g., in opposite directions). A connector 38 can be provided for connecting to a bar (not shown) that provides a force at the connector to control rotation of the latch 32, as discussed further herein.

Figure 8:
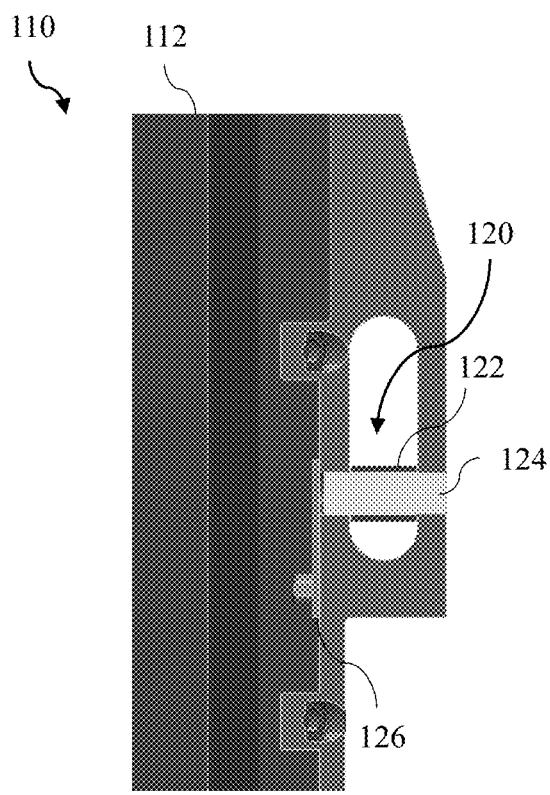
FIG. 8 illustrates a sectional view of a portion of a payload.
Figure 9:
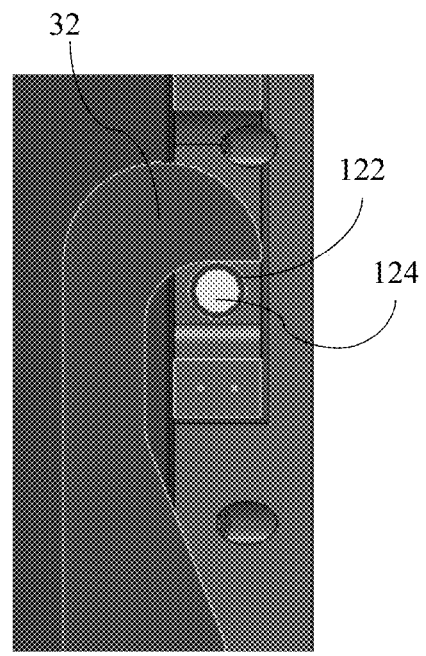
FIG. 9 illustrates a sectional view of a latch engaging a payload.

Referring now to FIGS. 8 and 9, a pin assembly is provided to allow engagement with the latch. For example, as shown in FIG. 8, a pin assembly 120 can include a pin 124 and a bushing 122. The pin 124 and/or the bushing 122 can extend from or away from the body 112 of the payload 110 so as to be engaged at a location away from the body 112. The pin 124 and/or the bushing 122 can be secured with respect to the body 112 by a pin cover 126.

As shown in FIG. 9, the latch 32 can be positioned so as to engage the bushing 122 and/or the pin 124. While in the engaged position, the latch 32 can prevent the payload 110 from moving in a direction past the latch 32. The latch 32 can be removed from the engaged position by actuating the latch 32 in a lateral direction, as discussed further herein. The pin 124 and/or the bushing 122 can be allowed to rotate freely with respect to each other and/or the body 112 of the payload 110. Such rotation can allow the latch 32 to move over and/or across the bushing 122 and/or the pin 124 with minimal or no friction.

Figure 10:
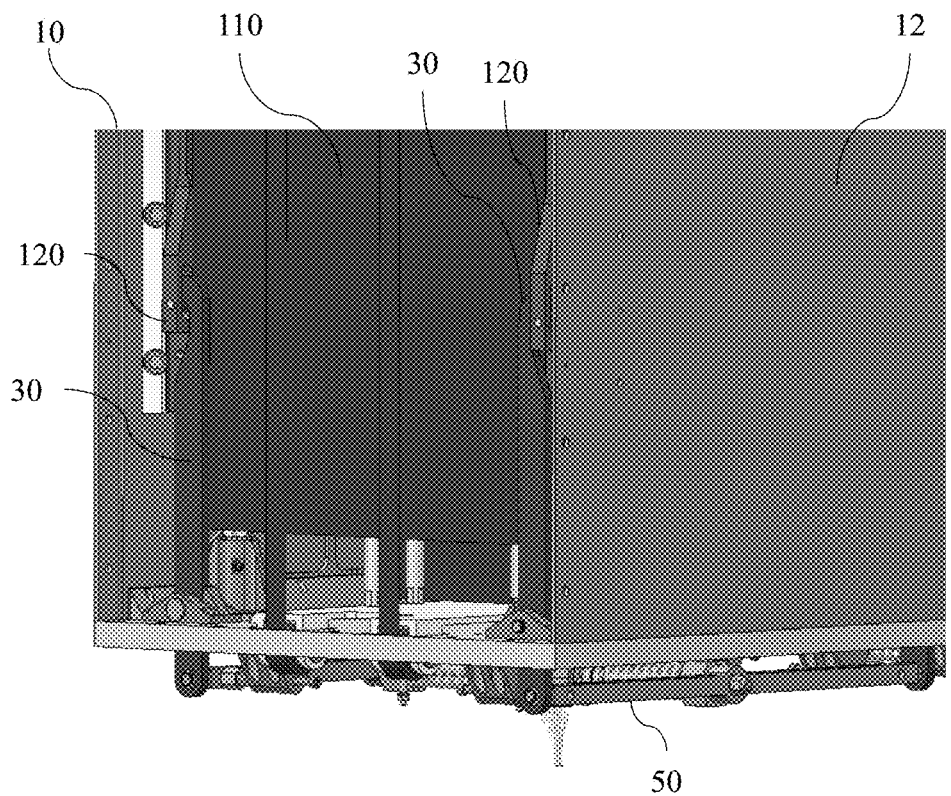
FIG. 10 illustrates a perspective view of a portion of a spacecraft.

Referring now to FIG. 10, the payload can be secured by the latch assemblies. For example, as shown in FIG. 10, each of multiple latch assemblies 30 of the carrier 10 can engage a corresponding one of multiple pin assemblies 120 of the payload 110. While in the engaged position, the payload 110 can be securely positioned within the frame 12 of the carrier 10. A release assembly 50 of the carrier 10 can controllably actuate the latch assemblies 30 to release the payload 110, as described further herein.

Figure 11:
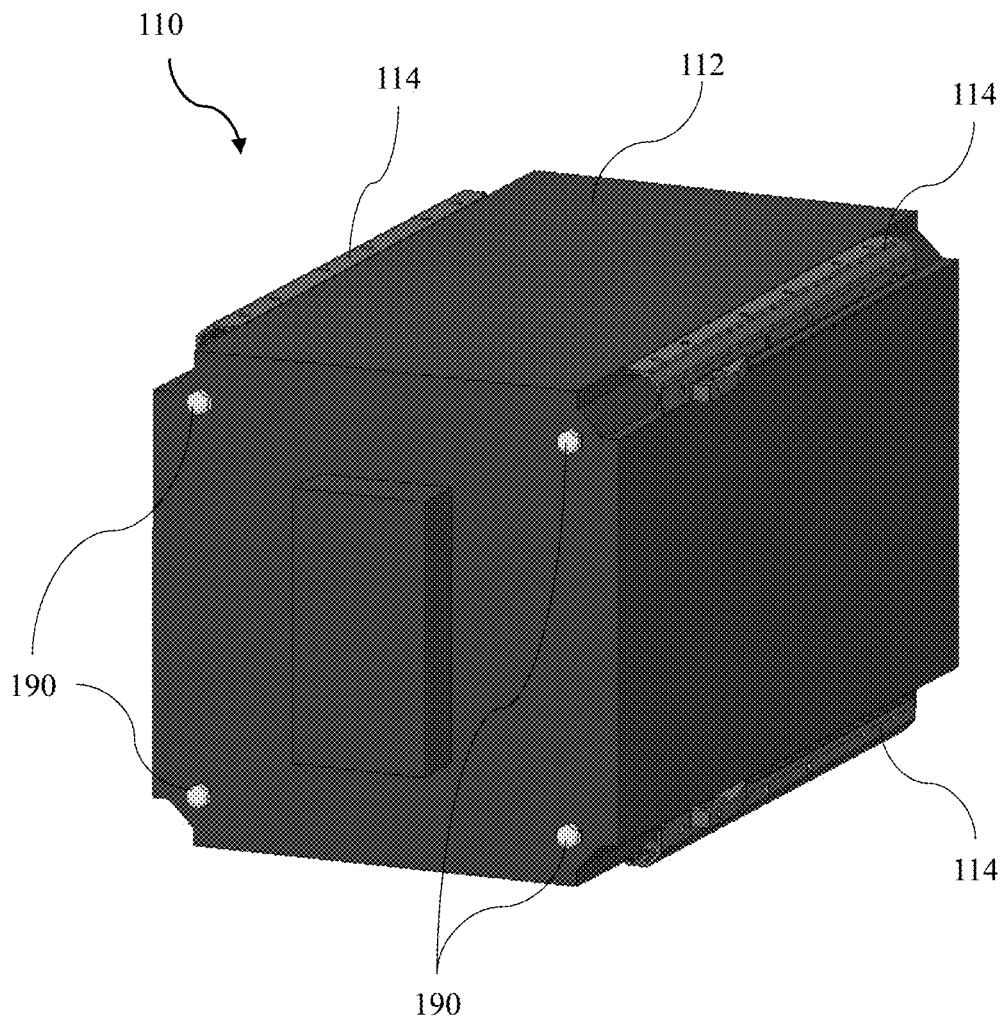
FIG. 11 illustrates a perspective view of a payload.

Referring now to FIGS. 11-15, a payload and a carrier can be provided with mechanisms for seating the payload during transport. For example, as shown in FIG. 11, the payload 110 can include one or more interface bolts 190 that protrude from the body 112 of the payload 110. The interface bolts 190 can be provided on a same side (e.g., bottom) of the body 112. For example, the interface bolts 190 can be provided on a side that faces a direction of travel while the payload 110 is inserted into a carrier.

Figure 12:
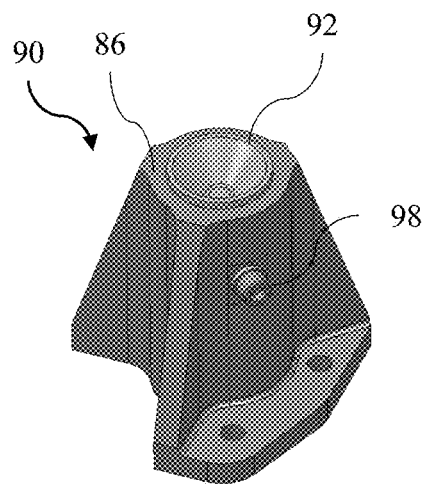
FIG. 12 illustrates a perspective view of a receiver assembly.

As shown in FIG. 12, a receiver assembly 90 can be provided within a carrier to receive a corresponding interface bolt of a payload. The receiver assembly 90 can include a receiver housing 86 that contains a cup element 92 therein. The cup element 92 can be movably positioned within the receiver housing 86. A fastener 98 can be provided to limit movement of the cup element 92 within the receiver housing 86, as discussed further herein.

Figure 13:
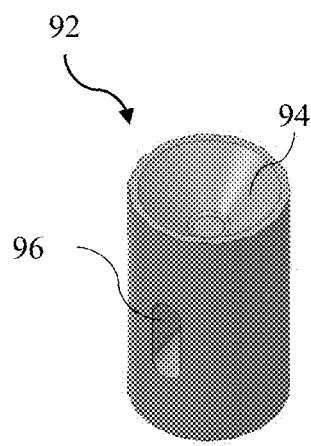
FIG. 13 illustrates a perspective view of a cup element of the receiver assembly of FIG. 12.

As shown in FIG. 13, the cup element 92 can include an elongated shape, such as a generally cylindrical shape, to facilitate longitudinal movement within the receiver housing. At an end thereof, the cup element 92 can include a recessed 94 for receiving an interface bolt. The recessed 94 can be generally concave. For example, the recessed 94 can be conical or frustoconical. It will be understood that other shapes are contemplated, such as semi-spherical shapes and/or any shape configured to receive the interface bolt, including shapes that are complementary to the interface bolt. As further shown in FIG. 13, the cup element 92 can include a travel gap 96 extending through at least a portion of the cup element 92.

Figure 14:
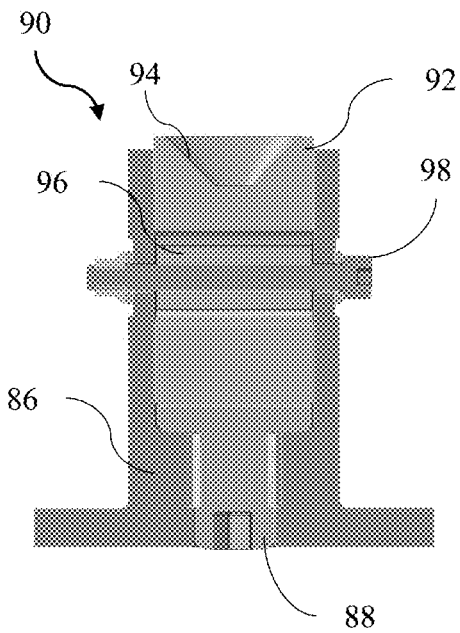
FIG. 14 illustrates a sectional view of the receiver assembly of FIG. 12.

As shown in FIG. 14, the fastener 98 can extend through at least a portion of the travel gap 96. A height of the travel gap 96 can be greater than a width of the fastener 98, such that the cup element 92 can travel longitudinally within the receiver housing 86 within the limits set by the travel gap 96 and the fastener 98. For example, the cup element 92 can travel in either of two opposing directions along a longitudinal axis until the boundaries of the travel gap 96 abut the fastener 98. The position of the cup element 92 within the receiver housing 86 can be determined, at least in part, by a preload lug 88. For example, the preload lug 88 can be adjustably positioned adjacent to the cup element 92. By further example, the preload lug 88 can be threaded or otherwise connected to the receiver housing 86, such that the preload lug 88 can be adjusted to maintain a particular position relative to the receiver housing 86. Accordingly, the preload lug 88 can provide a limit on the travel of the cup element 92 within the receiver housing 86.

Figure 15:
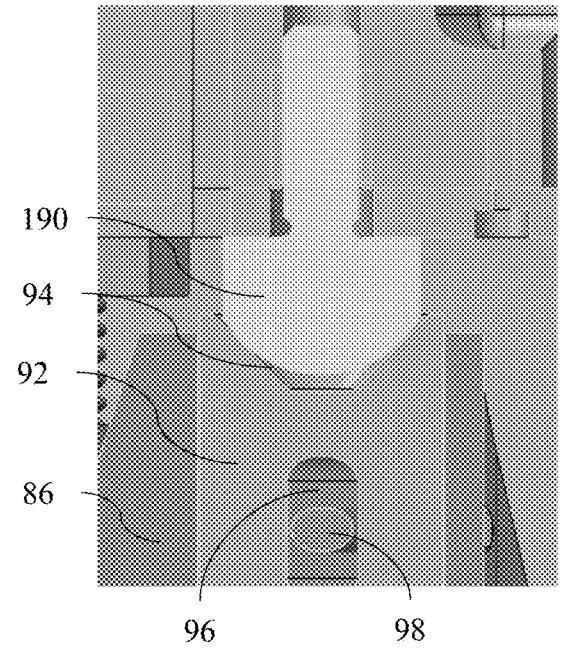
FIG. 15 illustrates a sectional view of an interface bolt of a payload within a receiver assembly.

As shown in FIG. 15, the interface bolt 190 of the payload can be provided so that it is seated within the recess 94 of the cup element 92. Where the recess 94 is conical and the interface bolt 190 is spherical, the region of contact between the recess 94 and the interface bolt 190 is represented by a ring. This configuration provides multiple points of contact, which may be a continuous ring (i.e., 360°). During initial installation, the recessed 94 can guide the cup element 92 into an aligned position. Thereafter, the preload lug can be adjusted to position the cup element 92 relative to the interface bolt 190, as discussed further herein.

Figure 16:
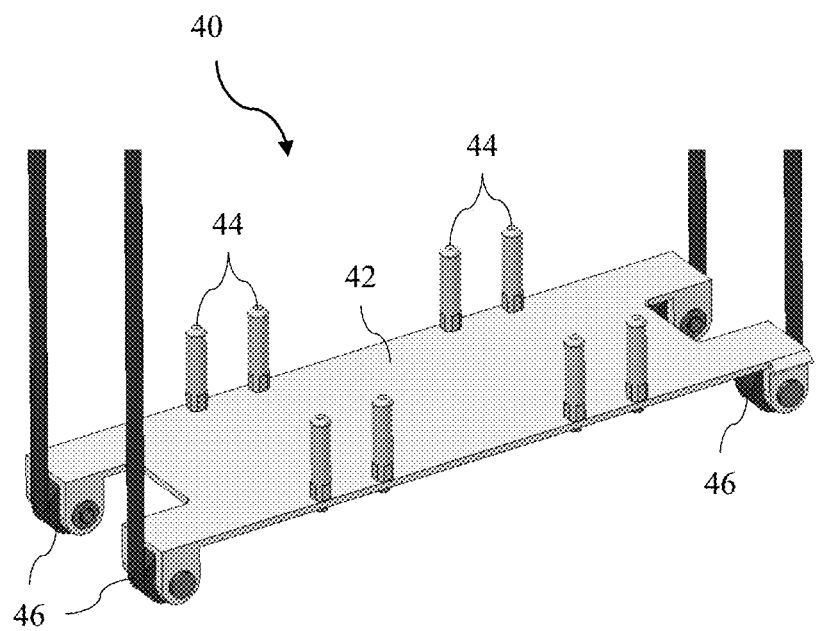
FIG. 16 illustrates a perspective view of a pusher assembly.
Figure 17:
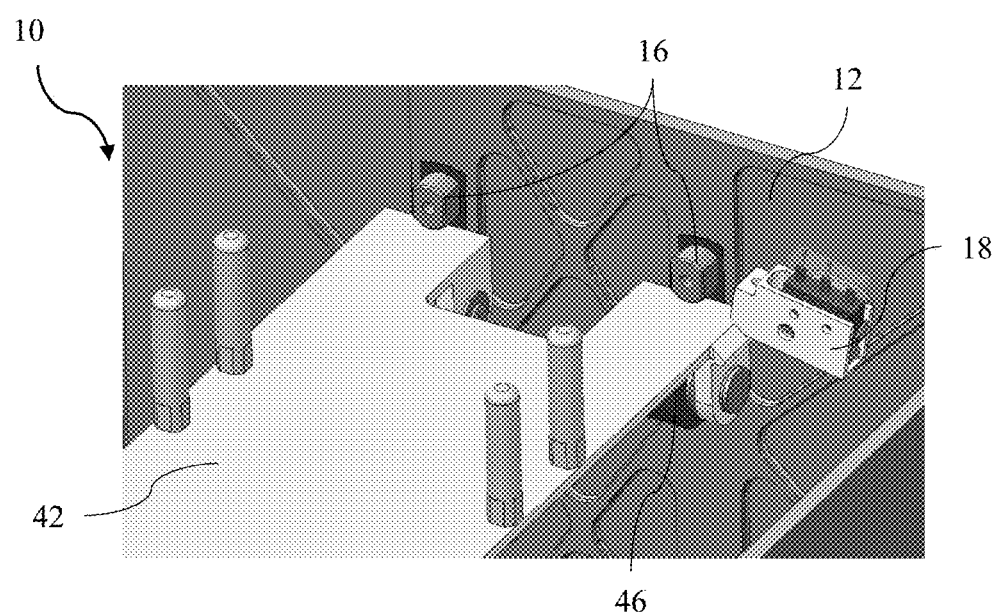
FIG. 17 illustrates a perspective view of the pusher assembly of FIG. 16 within a frame of a carrier.

Referring now to FIGS. 16 and 17, a pusher assembly can be provided for receiving a payload and for pushing a payload out of a carrier. As shown in FIG. 16, a pusher assembly 40 can include a platform 42 that is supported by one or more lift springs 46 that extend from the platform 42. For example, multiple lift springs 46 can extend from the platform 42 and couple to the frame of the carrier. Each lift spring can be configured to have a bias to urge the platform 42 toward one side of the carrier. For example, the lift springs 46 can include coils or another structure that gradually retracts a length of material toward the platform. When secured to the frame, the lift springs 46 can gradually lift the platform 42 in a direction as the retraction occurs. For example, the lift springs 46 can be or include constant force springs, such as strips of metal that are rolled up and are biased toward a rolled up state. When the pusher plate is extended, forces applied by the lift springs 46 tending toward the rolled up state cause the platform 42 to deploy the payload.

As further shown in FIG. 16, one or more spacers 44 can be provided on the platform 42. Each of the spacers 44 can extend from a side of the platform 42 to contact a payload when rested thereon. The spacers 44 can be positioned to contact the payload at preferred locations and distribute forces at such locations. It will be understood to any number of spacers 44 can be provided in any arrangement to engage the payload and distribute forces thereon.

As shown in FIG. 17, the platform 42 is shown in an advanced position with the lift springs 46 and a retracted position. The frame 12 of the carrier 10 can be provided with one or more stoppers 16 to contact the platform 42 to limit movement thereof. For example, one or more stoppers 16 can protrude from a surface of the frame 12. The carrier 10 can include a sensor 18 that detects a position and/or contact with the platform 42, thereby allowing a control system to determine when the platform 42 has been advanced and a payload deployed from the carrier 10.

Figure 18:
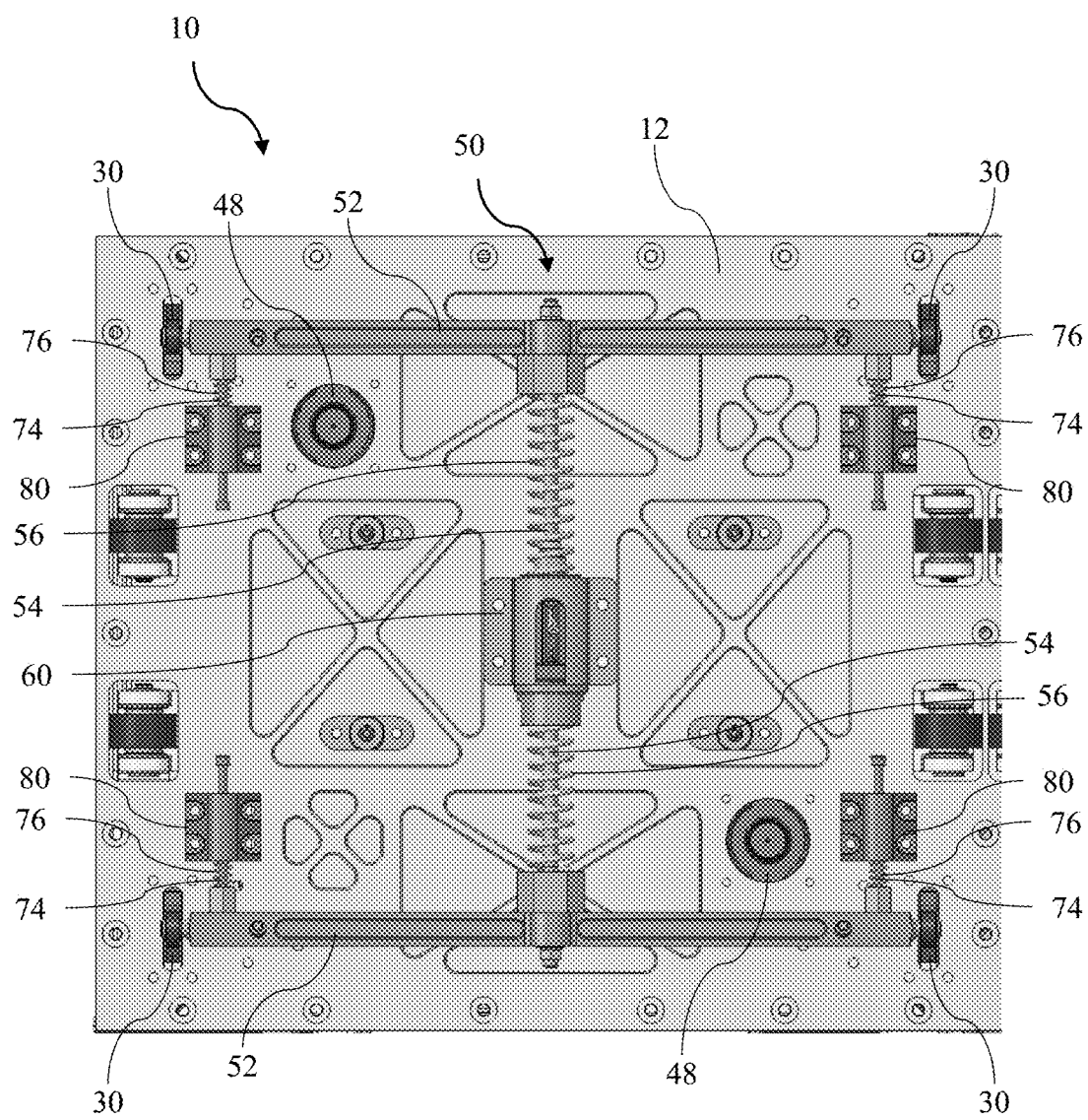
FIG. 18 illustrates a bottom view of a spacecraft, including a carrier having a release assembly.
Figure 19:
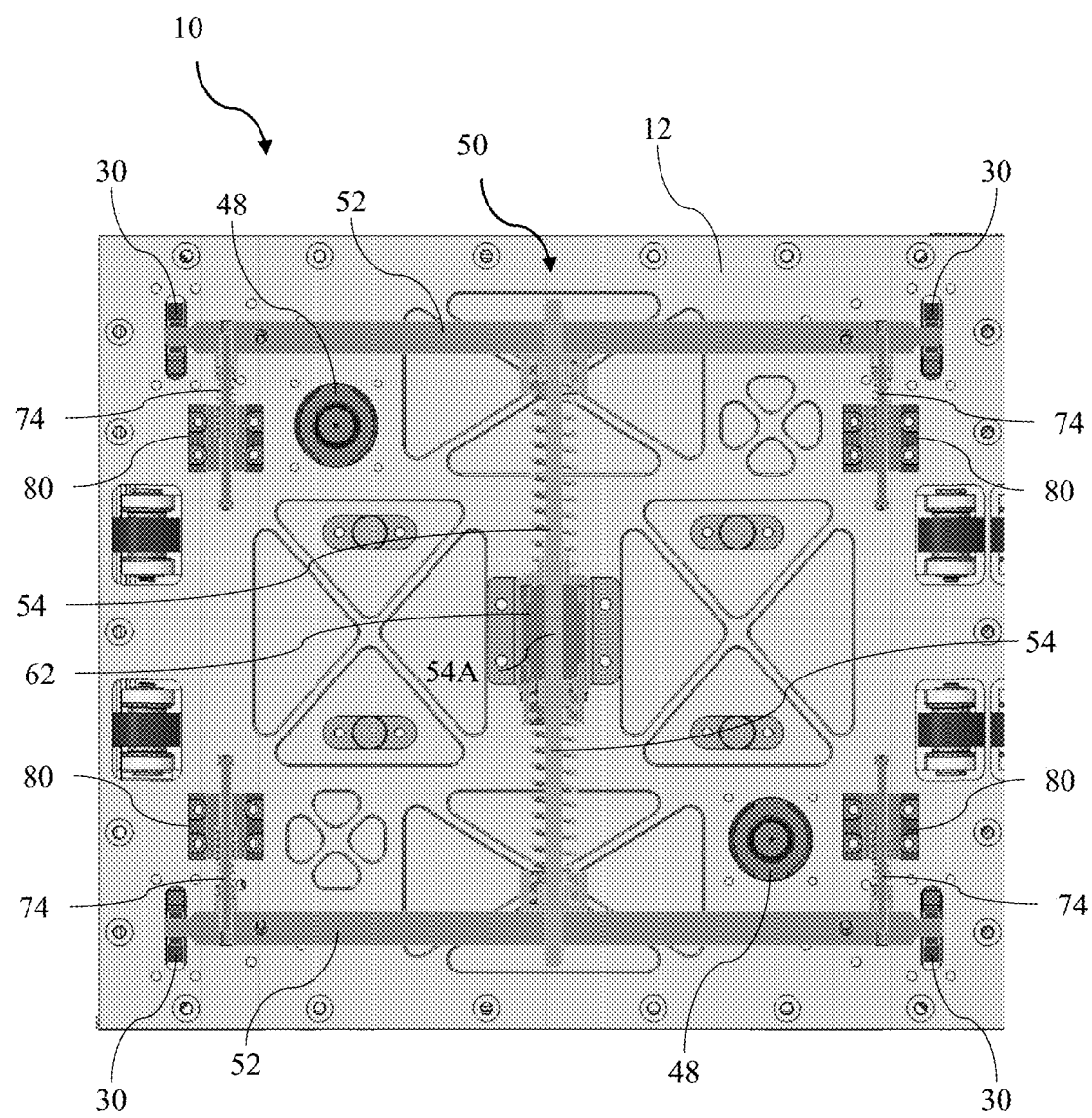
FIG. 19 illustrates a partial sectional view of the carrier of FIG. 18.

Referring now to FIGS. 18 and 19, the carrier can be provided with a release assembly for actuating latch assemblies of the carrier and deploying a payload from the carrier. For example, as shown in FIG. 18, a release assembly 50 and/or components thereof can be provided on an outer side (e.g., bottom) of the carrier. By further example, the release assembly 50 and/or components thereof can be provided exterior to the frame 12. Components of the release assembly 50 can engage one or more latch assemblies 30 that extend to an interior of the frame 12.

As further shown in FIG. 18, multiple latch assemblies 30 can be distributed at different locations along a side of the frame 12. Components of the release assembly 50 can engage one or more of each of the latch assemblies 30. While the configuration shown in FIG. 18 provides for latch assemblies 30 and a pair of release bars 52 each connecting to a pair of the latch assemblies 30, it will be understood that any number of latch assemblies 30 can be provided and any number of release bars 52 can be provided to engage any number of the latch assemblies.

A release bar 52 can be provided each of the release bars 52 can be biased by one or more spring mechanisms. For example, a main spring 56 can be positioned between the release bar 52 and a main base 60 to bias the release bar 52 away from the main base 60. While the main spring 56 may bias the release bar 52, a main shaft 54 may retain the release bar 52 in a given position until the main shaft 54 is severed, as discussed further herein.

The release bar 52 can be further be biased by one or more side springs 76. For example, a side spring 76 can be positioned between the release bar 52 and a side base 80 to bias the release bar 52 away from the main base 60. A side shaft 74 can extend through the side base 80 and the side spring 76 to guide travel. Multiple (e.g., two) side springs 76 can be provided on opposing sides of the main spring 56 and the main shaft 54, such that balanced forces are applied to the release bar 52.

As further shown in FIG. 18, one or more interfaces 48 can be provided through the frame 12 for connection to the payload. Such interfaces 48 can include communication interfaces, mechanical interfaces, fluid exchange interfaces, and the like.

As shown in FIG. 19, the main shaft 54 can include a severance region 54A that joins segments of the main shaft 54 or multiple main shafts 54. The severance region 54A can be an integral portion of a monolithic main shaft 54. For example, the severance region 54A can include a notch to define a cross-sectional dimension that is smaller than a cross-sectional dimension of adjacent segments of the main shaft 54. An actuator 62 can be provided in a position that spans the severance region 54A. For example, the actuator 62 can be coupled to segments of the main shaft 54 on opposing sides of the severance region 54A. The actuator 62 can be configured to expand based on a stimulus (e.g., heat) applied to the actuator 62 (e.g., by a heating coil). The actuator 62 can include a material, such as a shape memory alloy (e.g., Nitinol) that transitions under the applied stimulus. As the actuator 62 expands, the separate segments of the main shaft 54 are pulled in opposite directions at the point of coupling with the actuator 62. Accordingly, the main shaft 54 is severed at the severance region 54A, and the segments of the main shaft 54 are free to move away from each other under the influence of the main springs, as discussed above. The movement of the main shafts 54 (or segments thereof) move the release bars 52 accordingly and actuate the latch assemblies 30.

Figure 20:
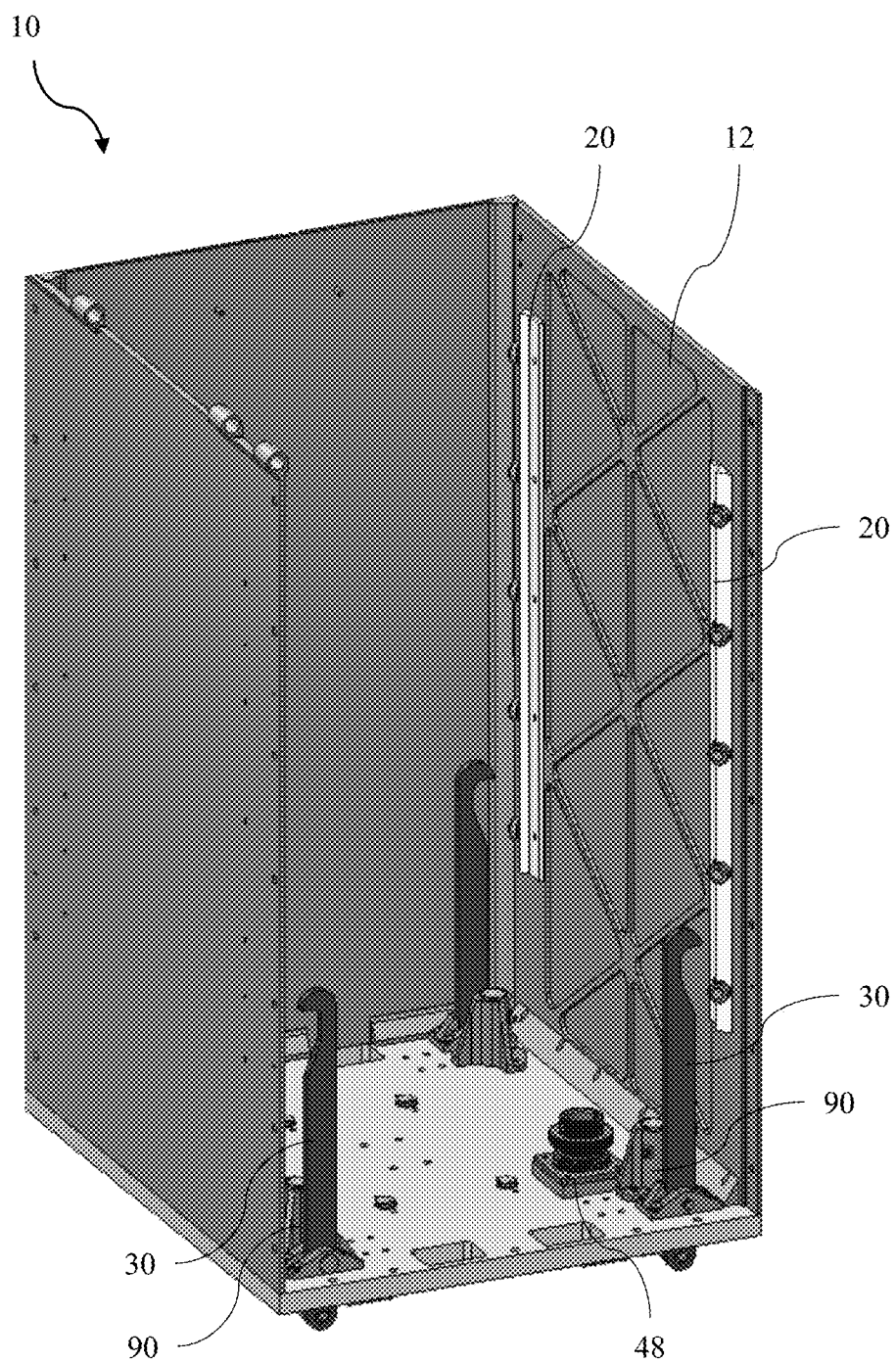
FIG. 20 illustrates a perspective view of a carrier.
Figure 21:
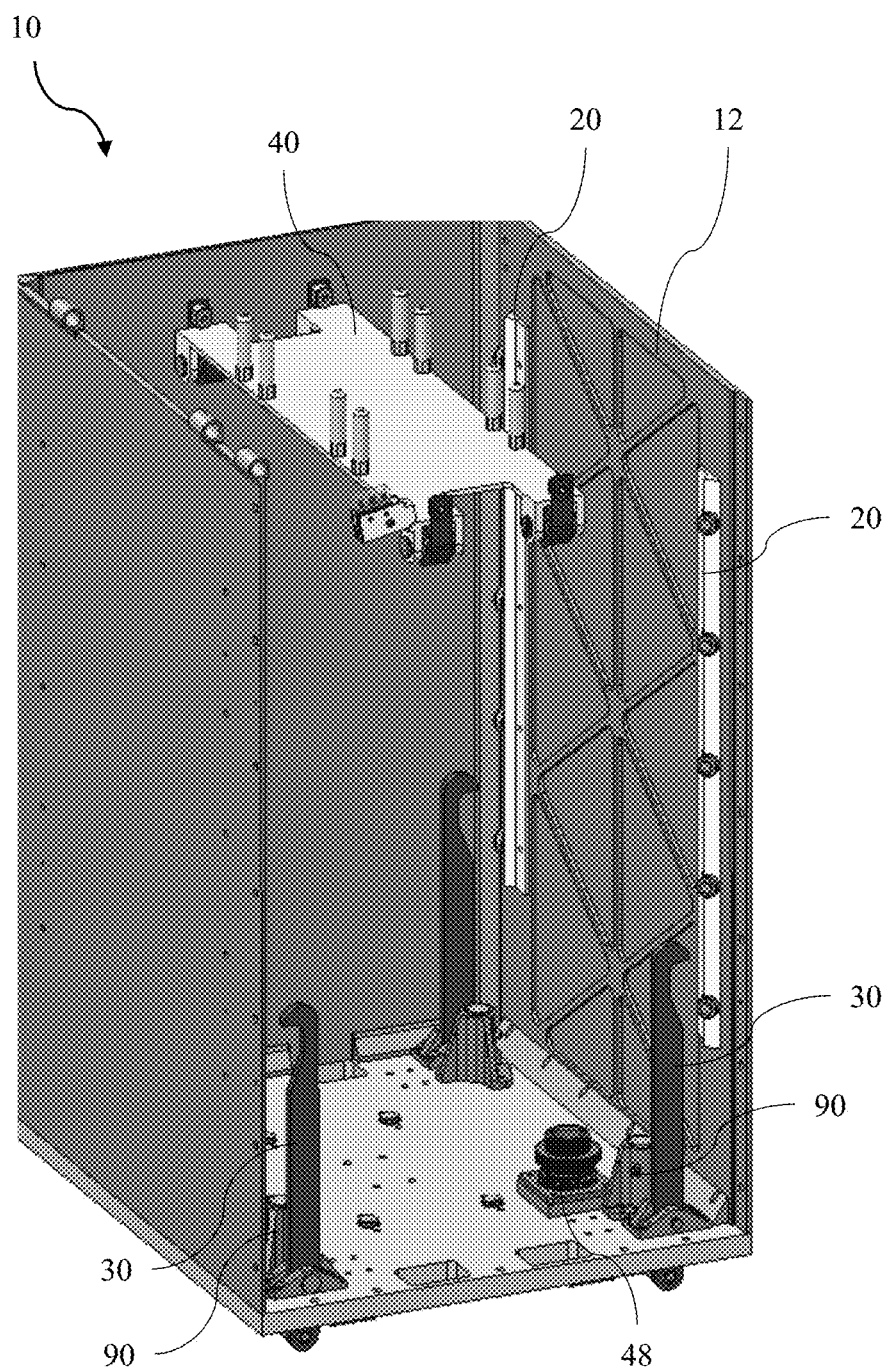
FIG. 21 illustrates a perspective view of the carrier of FIG. 20 with a pusher assembly.
Figure 22:
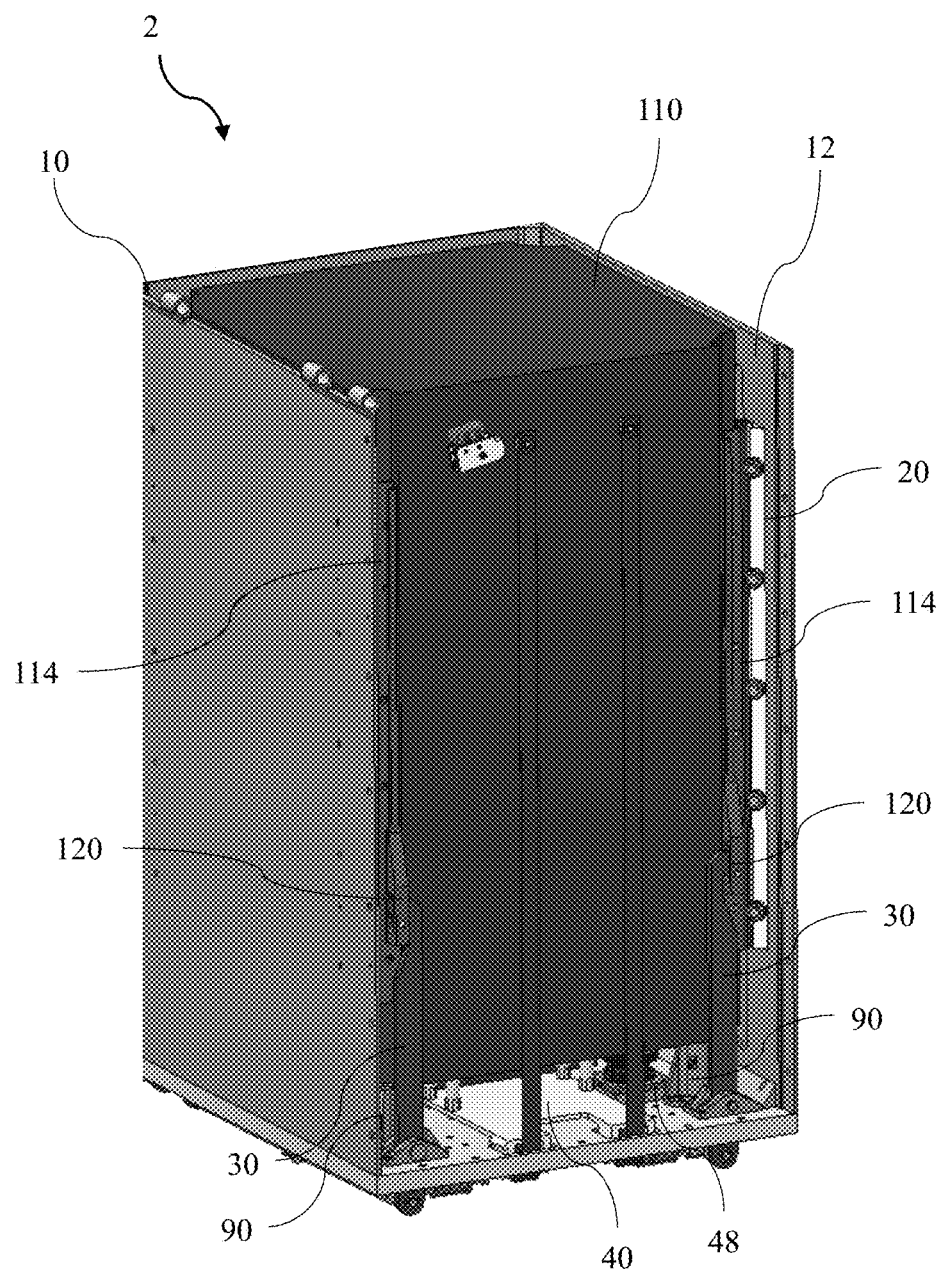
FIG. 22 illustrates a perspective view of the carrier of FIG. 20 with a payload on a pusher assembly.

Referring now to FIGS. 20-22, the payload can be installed into the carrier and secured therein. For example, as shown in FIG. 20, the carrier 10 can be provided in a configuration ready for receiving the payload therein. As shown in FIG. 21, the pusher assembly 40 of the carrier 10 can be provided in an advanced configuration for supporting the payload upon insertion thereof.

As shown in FIG. 22, the payload 110 can be placed on the pusher assembly 40 and inserted into the frame 12 of the carrier 10. As a payload 110 is inserted, the pusher assembly 40 can be extended downward while supporting the payload 110. Rails 114 of the payload 110 can interact with roller assemblies 20 of the carrier to guide the payload 110 along a path. The payload 110 can rest upon receiver assemblies 90 of the carrier 10 and or interact with the interface 48 of the carrier 10. Once inserted, the payload 110 can be engaged by latch assemblies 30 of the carrier 10 at pin assemblies 120 of the payload 110. In such a configuration, the latch assemblies 30 can retain the payload within the carrier 10.

Figure 23:
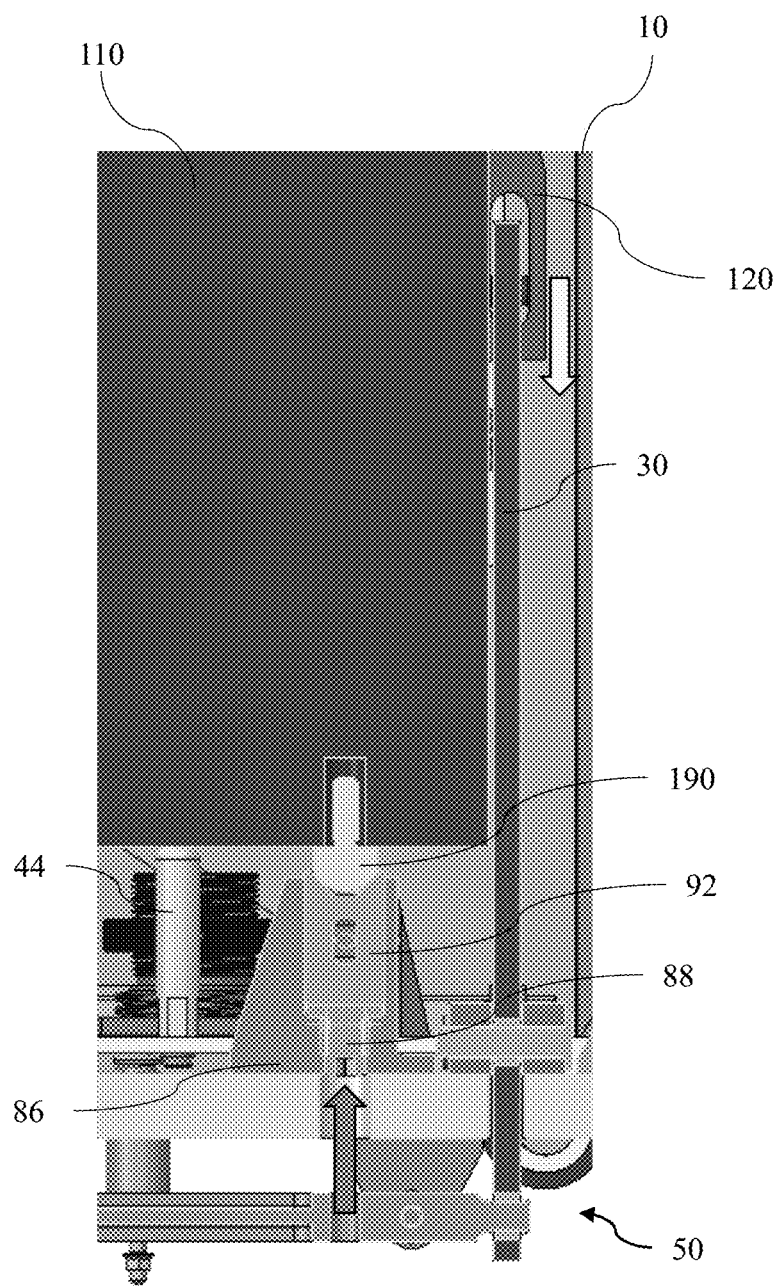
FIG. 23 illustrates a sectional view of the carrier of FIG. 22 with a payload on a pusher assembly and engaged by a latch assembly.

Referring now to FIGS. 23-26, the payload can be secured within the carrier and controllably released therefrom. For example, as shown in FIG. 23, the payload 110 can rest upon the spacers 44 of the pusher assembly and provide the interface bolts 190 seated within the cup elements 92 of the receiver assemblies.

Figure 24:
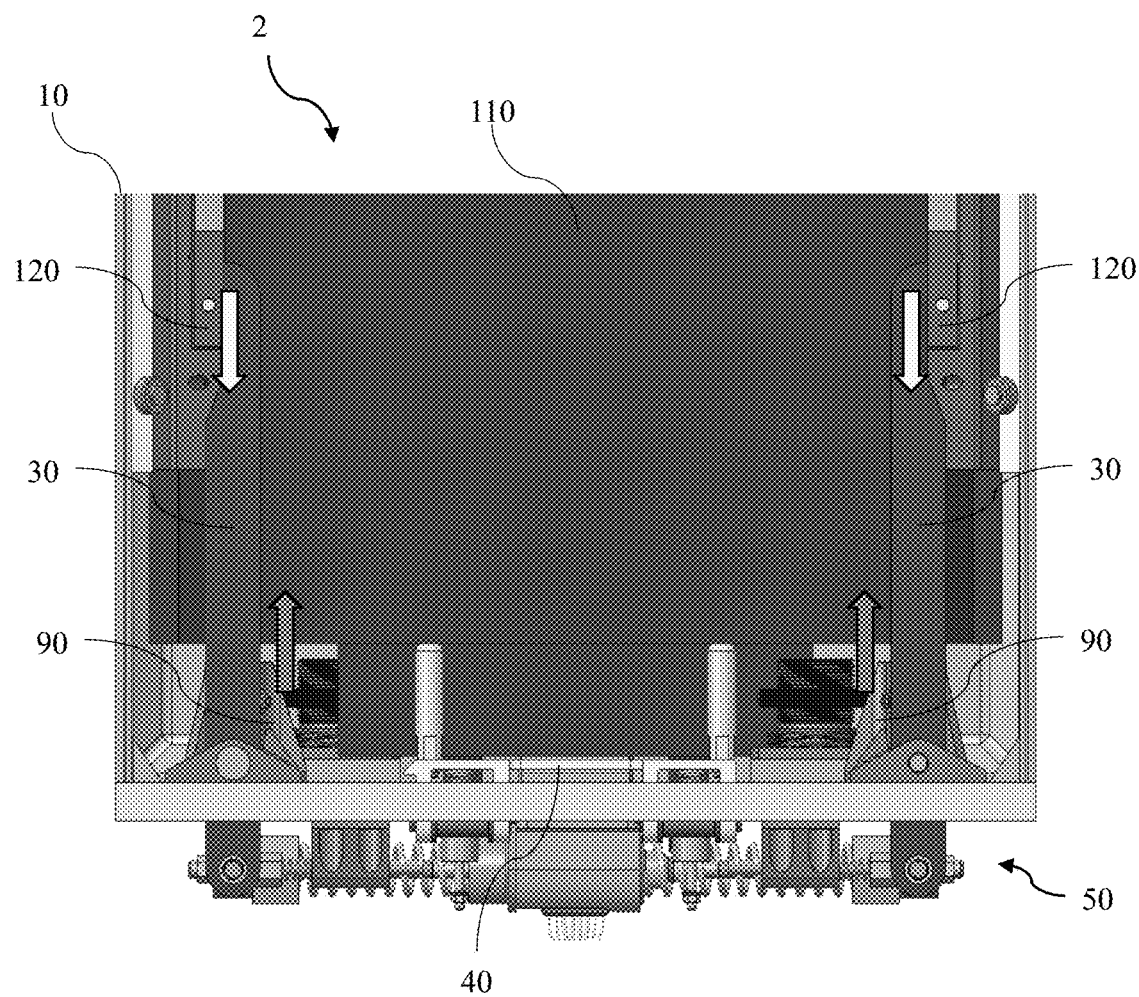
FIG. 24 illustrates a side view of a carrier with a payload on a pusher assembly and engaged by a latch assembly.

As shown in FIGS. 23 and 24, while the interface bolts are seated within the cup elements 92, the latch assemblies 30 can engage the pin assemblies 120 to limit movement of the payload 110 out of the carrier 10. Additionally, while the latch assemblies 30 engage the pin assemblies 120, the preload lugs 88 can be adjusted within the receiver housings 86 to advance the cup elements 92. As the preload lugs 88 are advanced, the cup elements 92 apply forces to the payload 110 via the interface bolts 190. At the same time, the latch assemblies 30 apply an opposing force to the payload 110 via the pin assemblies 120. These opposing forces securely maintain the payload 110 in its position. Additional forces can be applied by the pusher assembly 40, however such forces can be significantly less than the opposing forces from the receiver assemblies 90 and the latch assemblies 30.

Figure 25:
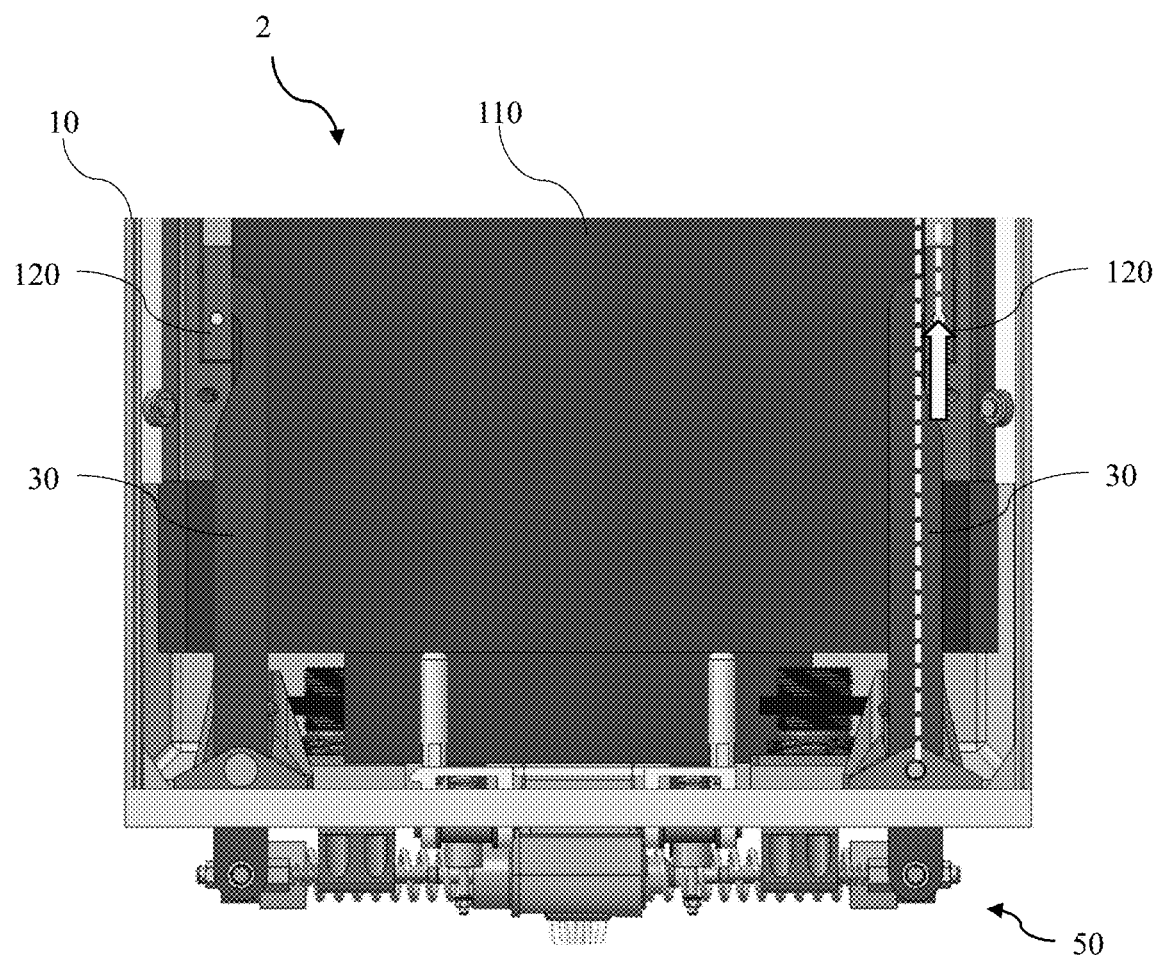
FIG. 25 illustrates a side view of a carrier with a payload on a pusher assembly and engaged by a latch assembly.

As shown in FIG. 25, the forces applied by the latch assemblies 30 can be at a location that is often axis of the latch assembly 30. For example, in axis extending through a pivot of a latch assembly 30 may not pass through the point of contact between the latch assembly 30 and the pin assembly 120. This can facilitate release of the latch assemblies 30 from the pin assemblies 120. For example, as the latch assemblies 30 move away from the pin assemblies 120, such movement may be smooth and even facilitated by the alignment described above.

Figure 26:
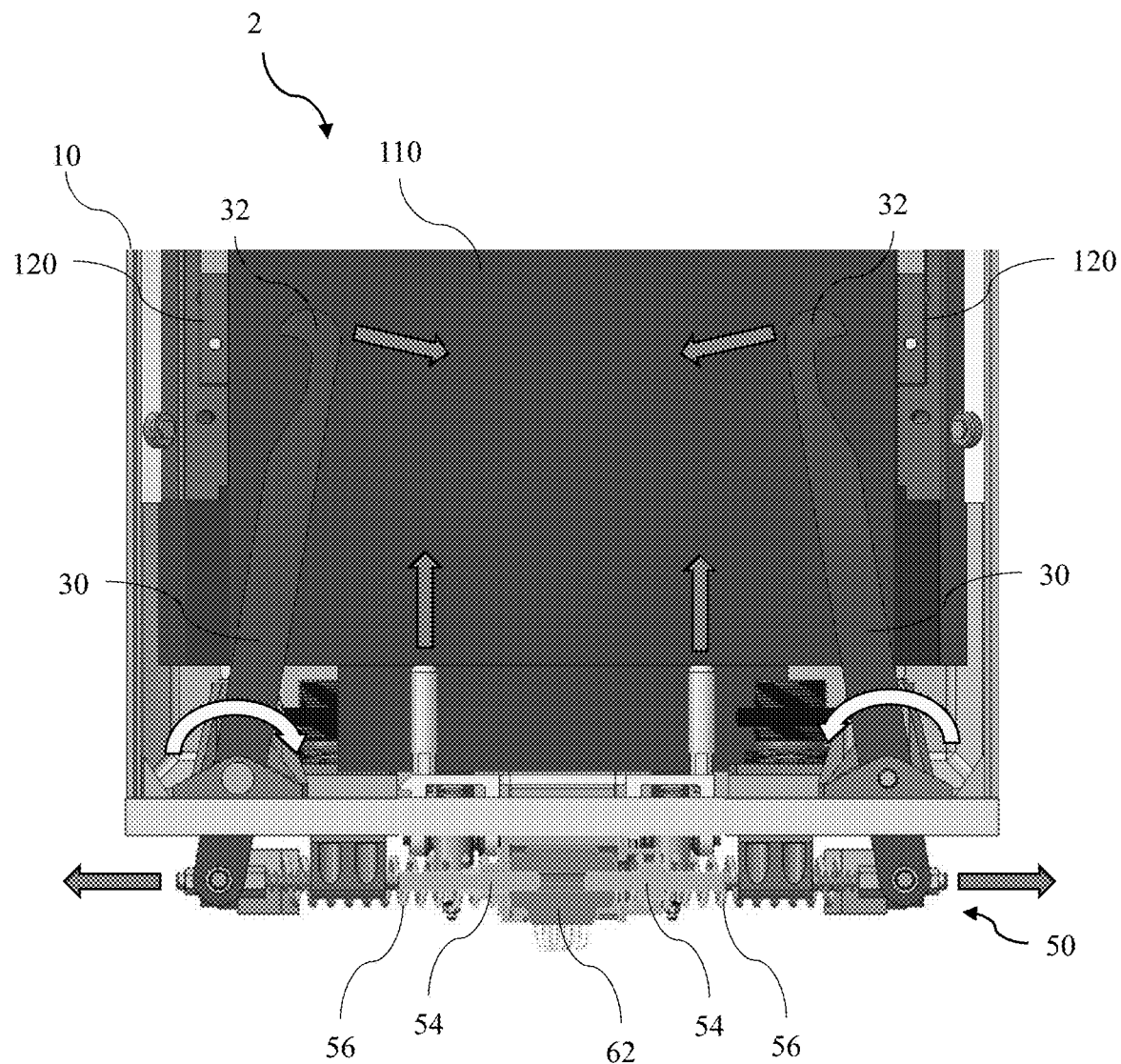
FIG. 26 illustrates a sectional view of the carrier of FIG. 25 with the payload having been released from the latch assembly.

As shown in FIG. 26, the payload 110 can be released based on operation of the release assembly 50. For example, the actuator 62 can be operated as described herein to sever the main shaft 54 and allow the main springs 56 to actuate the latch assemblies. In particular, release bars of the release assembly 50 can be moved in opposite directions by the segments of the main shaft 54. Such motion can cause each of multiple latches 32 to rotate about a pivot.

Typically, notched bolts or shafts have a design load limit before the severance region breaks. Since the main shaft 54 is not in the direct preload path that retains the payload 110, the only limitation for preloading with the receiver assemblies 90 is the strength of the latch assemblies 30 and supporting structures. Accordingly, the design described herein can be scaled to accommodate different sized payloads.

As shown, a single actuator 62 can be used to perform all needed actuations for release. Accordingly, it is not necessary to coordinate the timing of two different actuators, which might otherwise introduce disparities in timing and therefor unbalanced forces. Because the actuator 62 severs the main shaft 54 at a location away from the payload 110, any sudden shock or forces are not directly applied to the payload 110. For example, as shown in FIG. 26, the main shaft 54 is severed and moves in opposite directions, thereby providing balanced forces. Additionally, the resulting movement is of the latches 32, which move away from the pin assemblies 120. In contrast to a notched bolt or shaft that retains a payload with tension directly applied thereto and the suddenly releases the tension with severance, the force, impact, and/or shock from the severance of the main shaft 54 is not translated to the payload 110, but rather actuates the latch assemblies 30 such that the latches simply move laterally away from the pin assemblies 120.

Upon release of the latch assemblies 30 from the pin assemblies 120, forces applied by receiver assemblies are readily released. Although such forces can be high (e.g., significantly higher than a force applied by the pusher assembly 40), the forces applied by the receiver assemblies are rapidly dissipated upon release by the latch assemblies 30. Forces applied by the pusher assembly 40 remain and are gradually applied to the payload 110 as it is advanced out of the carrier 10.

Accordingly, embodiments of the present disclosure can include a carrier of a spacecraft that can include multiple latch assemblies that are linked together and held in place by one notched bolt or shaft, which is out of the main load path. The latch assemblies secure the payload (e.g., CubeSat device) within a carrier by interfacing with pin assemblies on the payload. The dimensions of the latch assemblies can be easily modified to accommodate the payload design and testing requirements.

After the latch assemblies are engaged and secured with the notched bolt or shaft, each latch assembly is preloaded in tension using a corresponding preload lug of a receiver assembly. The amount of preload being put into the interface can be monitored by instrumenting the four latch assemblies with strain gages. This allows the preload value to be catered to the specific payload's design requirements to ensure that the interfaces do not gap under launch conditions.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A spacecraft comprising:
   a payload comprising a first pin assembly and a second pin assembly; and
   a carrier comprising:
      a first latch assembly for engaging the first pin assembly and a second latch assembly for engaging the second pin assembly and retaining the payload under a load when the first latch assembly and the second latch assembly are in a locked position; and
      an actuator;
      a first main spring on a first side of the actuator and biasing the first latch assembly to a released position;
      a second main spring on a second side of the actuator and biasing the second latch assembly to the released position;
      a main shaft extending through an entirety of the actuator, an entirety of the first main spring, and an entirety of the second main spring, wherein the actuator is configured to sever the main shaft, wherein the first main spring urges the first latch assembly to the released position and the second main spring urges the second latch assembly to the released position when the actuator severs the main shaft.

2. The spacecraft of claim 1, wherein the actuator is a shape memory alloy actuator.

3. The spacecraft of claim 1, wherein:
   the payload further comprises an interface surface defining a length of an outer periphery of the payload; and
   the carrier further comprises multiple rollers configured to contact the interface surface of the payload and rotate as the payload moves within the carrier.

4. The spacecraft of claim 1, wherein:
   the payload further comprises an interface bolt at an end of the payload, the interface bolt having a convex end; and
   the carrier further comprises:
      a receiver housing;
      a cup element having a recess for receiving the interface bolt, the cup element being movable along an axis within the receiver housing; and
      a preload lug configured to adjustably move the cup element within the receiver housing to abut the interface bolt.

5. The spacecraft of claim 4, wherein the preload lug is adjustable to urge the payload until the first pin assembly abuts the first latch assembly and the second pin assembly abuts the second latch assembly so the first latch assembly and the second latch assembly apply the load to the first pin assembly and the second pin assembly.

6. The spacecraft of claim 1, wherein:
   the first latch assembly comprises a latch extending from a pivot along an axis;
   the load is applied at a region of contact between the latch and the first pin assembly; and
   the region of contact is away from the axis.

7. The spacecraft of claim 1, wherein the first pin assembly comprises:
   a pin; and
   a bushing rotatable about the pin and configured to contact the first latch assembly.

8. The spacecraft of claim 1, wherein the payload is a CubeSat device.

9. A carrier of a spacecraft for transporting a payload, the carrier comprising: multiple latch assemblies each configured to engage the payload; and a release assembly comprising: a main shaft retaining the latch assemblies in a locked position on the payload, the main shaft comprising segments on opposing sides of a severance region, the segments being joined to each other by the severance region to form a continuous surface; an actuator configured to sever the main shaft along the severance region to allow the segments to separate from each other; and multiple springs biasing the segments of the main shaft away from each other to move the multiple latch assemblies from the locked position to a released position when the main shaft is severed.

10. The spacecraft of claim 9, wherein each of the latch assemblies comprises:
    a latch rotatable about a pivot;
    a first stopper configured to abut the latch while in the locked position; and
    a second stopper configured to abut the latch while in the released position.

11. The spacecraft of claim 9, wherein each of the latch assemblies comprises:
    a receiver housing;
    a cup element having a recess for receiving an interface bolt of the payload, the cup element being movable along an axis within the receiver housing; and
    a preload lug configured to adjustably move the cup element within the receiver housing to abut an interface bolt of the payload.

12. The spacecraft of claim 9, wherein the release assembly further comprises:
    a release bar coupling the multiple latch assemblies to the main shaft; and
    side springs on opposite sides of one of the multiple springs, the side springs biasing the release bar away from the actuator to move the multiple latch assemblies from the locked position to a released position when the main shaft is severed.

13. The spacecraft of claim 9, further comprising a pusher assembly configured to move the payload out of the carrier when the multiple latch assemblies are moved to the released position.

14. The spacecraft of claim 13, further comprising a stopper configured to limit movement of the pusher assembly within the carrier.

15. The spacecraft of claim 13, further comprising a sensor for detecting a position of the pusher assembly within the carrier.

16. The spacecraft of claim 13, wherein the pusher assembly comprises:
    a platform;

multiple spacers for supporting the payload; and lift springs for applying a force to move the platform within the carrier.

17. A method comprising: retaining a payload within a carrier with a retaining force applied by a latch assembly of the carrier to a pin assembly of the payload while the latch assembly is in a locked position on the pin assembly; severing a continuous surface of a main shaft of the carrier with an actuator to form separate segments of the main shaft; urging the separate segments away from each other with springs until actuating the latch assembly moves from the locked position on the pin assembly to a released position away from the pin assembly by rotating a latch of the latch assembly about a pivot; and moving the payload out of the carrier with a pusher assembly.

18. The method of claim 17, further comprising, prior to retaining the payload within the carrier:

inserting the payload into the carrier;

moving the latch assembly to the locked position on the pin assembly; and adjusting a preload lug of the carrier to urge the payload until the latch assembly abuts the pin assembly so the latch assembly applies the retaining force to the pin assembly.

19. The method of claim 17, wherein rotating the latch comprises moving an end of the latch in a direction that is transverse to a direction of the retaining force.

* * * * *